United States Patent [19]

Okuno

[11] 3,723,615
[45] Mar. 27, 1973

[54] FUMIGANT INSECTICIDAL MIXTURES OF D-CHRYSANTHEMATES

[75] Inventor: Yositosi Okuno, Toyonaka, Japan

[73] Assignee: Sumitomi Chemical Company, Limited, Osaka, Japan

[22] Filed: Dec. 15, 1970

[21] Appl. No.: 98,357

[30] Foreign Application Priority Data

Dec. 24, 1969 Japan..................................45/1007

[52] U.S. Cl. ......................424/18, 424/40, 424/285, 424/306
[51] Int. Cl. ......A01n 9/28, A01n 17/00, A01n 17/04
[58] Field of Search..................424/18, 40, 285, 306

[56] References Cited

UNITED STATES PATENTS 3,248,287   4/1966   Sonbert..................................424/40

FOREIGN PATENTS OR APPLICATIONS 397,800    5/1964   Japan......................................424/40
3,920,740  9/1964   Japan......................................424/306

OTHER PUBLICATIONS

Montgomery et al., Application Serial No. 811,222, filed Mar. 27, 1969, published 12-16-69, as noted at 869 O.G. 712.
Montgonery et al., Application Serial No. 819,121, filed Apr. 24, 1969, published 2-10-70, as noted at 871 O.G. 353.

*Primary Examiner*—Albert T. Meyers
*Assistant Examiner*—Allen J. Robinson
*Attorney*—Stevens, Davis, Miller & Mosher

[57] ABSTRACT dl-2-allyl-3-methyl-cyclopent-2-ene-1-one-4-yl novel insecticidal composition in the form of a fumigant which contains as 44/1007 active ingredient a mixture of di-2-allyl-3-methyl-cyclopent-2-ene-1-one-4-yl dl-cis,trans-chrvsanthemate and 5-benzyl-3-furylmethyl-dl-cis,trans-chrysanthemate, or 5-benzyl-3-furyl-methyl-d-trans-chrysanthemate, which has a rapid knock down effect on injurious insects such as mosquitoes and an effect to delay the recovery of knocked-down injurious insects, and is useful for sanitary, agricultural and horticultural purposes.

4 Claims, 1 Drawing Figure

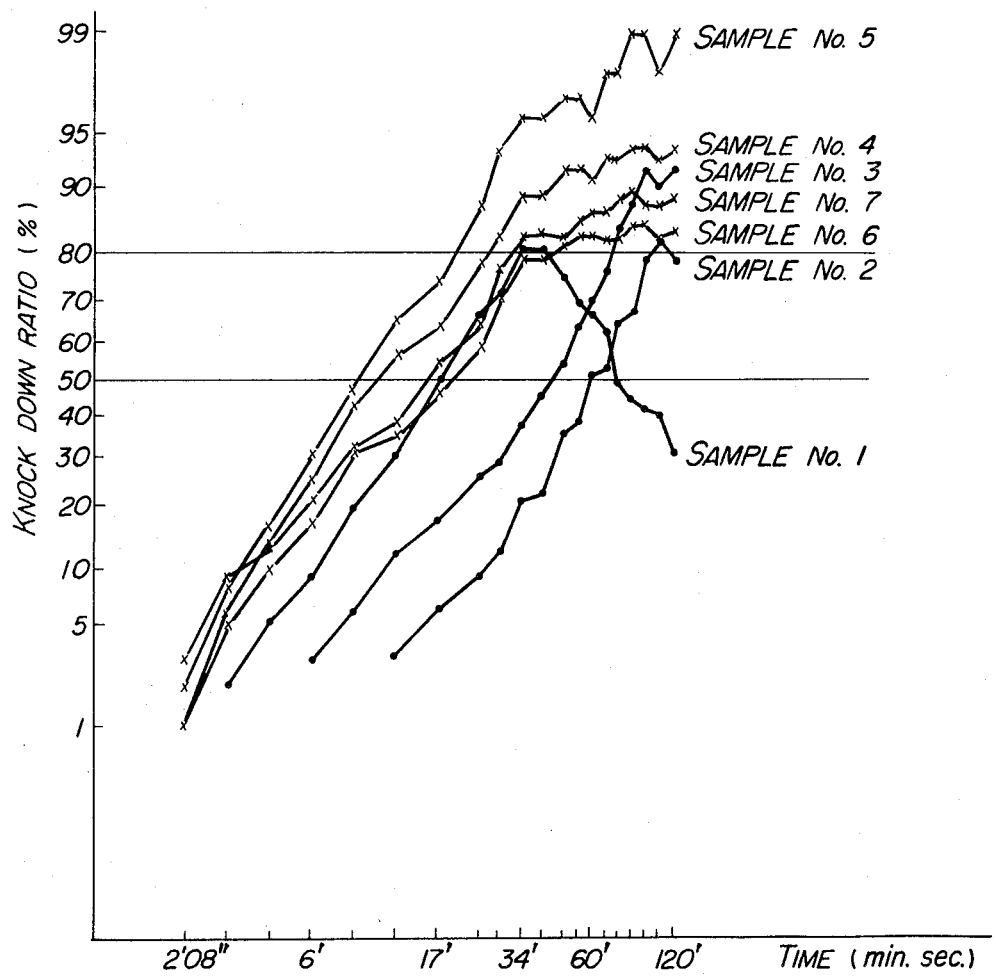

FUMIGANT INSECTICIDAL MIXTURES OF D-CHRYSANTHEMATES

This invention relates to an insecticidal composition in the form of a fumigant, characterized by containing as an active ingredient a mixture prepared by mixing each other in suitable proportions dl-2-allyl-3-methyl-cyclopent-2-ene-1-one-4-yl dl-cis,trans-chrysanthemate (hereinafter referred to as "allethrin") and 5-benzyl-3-furylmethyl-dl-cis,trans-chrysanthemate (hereinafter referred to as "Chrysron" which is a registered trade mark of an insecticide produced by Sumitomo Chemical Co. Ltd.), or 5-benzyl-3-furylmethyl-d-trans-chrysanthemate (hereinafter referred to as "d-trans-Chrysron"), which is an optical isomer of Chrysron.

Recently, the control of sanitary injurious insects such as mosquitoes, which are vectors of cerebritis, filaria and the like infectious diseases, has come to be a serious problem. What is of importance in the control of said injurious insects is to quickly knock down them and to kill the insects to inhibit their blood-sucking actions on mammals. For the control of this kind of insects, there have heretofore been used mosquito coils which in most cases contain either allethrin or pyrethrin as remain an active ingredient. These insecticides, however, are not always sufficient in killing effect, though they are rapid in knock down effect.

On the other hand, Chrysron or d-trans-Chrysron is excellent in killing effect when used in any form of oil spray or aerosol, but is so inferior in knock down effect to allethrin and pyrethrin that it is not practically usable alone particularly in mosquito coils.

As the results of extensive studies to give insecticides having higher insecticidal activities with low toxicity to mammals, firstly the present inventor has found that a mixture of allethrin and Chrysron or a mixture of allethrin and d-trans-Chrysron displays synergistic acitons not only in knock down effect but also in killing effect on various injurious insects.

When the mixture is used in an ordinarily adopted form such as oil sprays, aerosols or emulsifiable concentrates, however, marked advantages cannot always be given in practice, even if the insecticidal activities are synergistically increased, because there is known other excellent insecticide containing a mixture of Chrysron and phthalthrin (N-(chrysanthemoxymethyl)-3,4,5,6-tetrahydrophthalimide), which is far more marked in insecticidal activities in the above mentioned form than the composition containing the mixture of allethrin and Chrysron or d-trans-Chrysron.

As the result of further extensive studies, the present inventor has further found that when used in the form of a heating fumigant, which is necessarily subjected to heating and hence is entirely different in application conditions from those of other forms such as oil sprays and aerosols, the mixture of allethrin and Chrysron or the mixture of allethrin and d-trans-Chrysron can exhibit a strong synergistic effect to display such a surprisingly high insecticidal effect as not to be inferred from the effect displayed when the mixture is used in the form of oil sprays or the like.

Surprising is finding that the mixture of allethrin and Chrysron and the mixture of allethrin and d-trans-Chrysron in the form of fumigant exhibit synergism in knock down effect and further has excellent effect to delay the recovery of insects knocked down. In the present invention, the effect to delay the recovery of insects knocked down is hereinafter referred to as the persistent effect.

Thus, an object of the present invention is to provide inexpensive insecticidal compositions which are low in toxicity, rapid in knock down effect and excellent in persistent effect, and hence are useful for sanitary purposes as well as agricultural and horticultural purposes.

The object of the present invention can be accomplished by providing an insecticidal composition in the form of a fumigant containing as an active ingredient a mixture of allethrin and Chrysron or a mixture of allethrin and d-trans-Chrysron, and an inert carrier, the mixing weight ratio of allethrin to Chrysron or d-trans-Chrysron being 10 : 0.5 to 30.

The accompanying FIGURE shows the relation between time and knock down ratio in knock down effects of individual mosquito coils on Northern house mosquito adults.

In order to further clarify the excellent effects of the present compositions, an experimental example and results thereof are set forth below.

Experimental Example

Mosquito coils containing individually each 0.3 percent of allethrin, Chrysron and d-trans-Chrysron were prepared. On the other hand, mosquito coils containing individually each 0.3 percent and 0.15 percent of the mixture of allethrin and Chrysron in the weight mixing ratio of 2 : 1 and the mixture of allethrin and d-trans-Chrysron in the weight mixing ratio of 5 : 1 were prepared.

Into a (70 cm)³ glass chamber were liberated a group of 20 Northern house mosquito adults, and a battery driven small motor fan (13 cm in blade diameter) was placed in the chamber and rotated. Thereafter, each mosquito coil cut to a length of about 3 cm was ignited at one end, burned for 1 minute in the chamber and then removed. After ignition of the mosquito coil, the number of knocked-down mosquitoes was counted with lapse of time for 120 minutes to calculate a knock down ratio at each time. At the same time, a 50 percent knock down time was calculated. Further, the theoretical $KT_{50}$ value of each mixture was calculated according to the equation of Yun-Pei Sun et al. [J. Econ. Entomology, 53, 887 (1960)], and compared with the actual $KT_{50}$ value. The results obtained are shown in Table 1 and the FIGURE.

It is clear that the present mixtures exhibit excellent synergism in knock down effect, because the actual $KT_{50}$ values of the sample Nos. 4 and 5 are below the theoretical $KT_{50}$ values, and it is said that the present mixtures exhibit knock down effect nearly two time enhanced, compared with that of the composition containing allethrin singly, because the knock down effects of the sample Nos. 6 and 7 are comparable to that of the sample No. 1. Moreover, it is clear that the present mixtures exhibit surprisingly excellent synergism in the persistent effect, the effect being about more than 16 times that of the composition containing allethrin singly at 80 percent knock down ratio.

Table 1

| Sample number | Composition, percent | Amount of mosquito coil burned (mg./min.) | Knock down ratio according to lapse of time | | | | | | | | | | | | | | | | | | | Found, KT₅₀ | Theoretical, KT₅₀ |
|---|---|---|---|---|---|---|---|---|---|---|---|---|---|---|---|---|---|---|---|---|---|---|---|
| | | | 2'08" | 3' | 4'15" | 6' | 8'30" | 12' | 17' | 24' | 28' | 34' | 40' | 48' | 54' | 60' | 68' | 75' | 84' | 94' | 105' | 120' | | |
| 1 | Allethrin | 0.3 | 0 | 2.0 | 5.1 | 9.2 | 19.4 | 30.6 | 51.0 | 66.3 | 71.4 | 80.6 | 80.6 | 75.5 | 69.4 | 67.3 | 62.2 | 49.0 | 44.9 | 42.9 | 40.8 | 31.6 | 17" | |
| 2 | Chrysron | 0.3 | 0 | 0 | 0 | 0 | 0 | 3.1 | 6.1 | 9.2 | 12.2 | 20.4 | 22.4 | 35.7 | 38.8 | 51.0 | 53.1 | 64.3 | 67.3 | 78.6 | 82.7 | 78.6 | 59'30" | |
| 3 | d-trans-chrysron | 0.3 | 0 | 0 | 0 | 3.0 | 6.0 | 12.0 | 17.0 | 26.0 | 29.0 | 38.0 | 46.0 | 54.0 | 64.0 | 70.0 | 76.0 | 84.0 | 88.0 | 92.0 | 90.0 | 92.0 | 44" | |
| 4 | A mixture of Allethrin 2, Chryston 1 | 0.3 | 1.0 | 6.0 | 14.0 | 26.3 | 43.0 | 57.0 | 64.0 | 78.0 | 83.0 | 89.0 | 89.0 | 92.0 | 92.0 | 91.0 | 93.0 | 93.0 | 94.0 | 94.0 | 93.0 | 92.0 | 10'12" | 22'15" |
| 5 | A mixture of Allethrin 5, d-trans-Chryston 1 | 0.3 | 2.0 | 8.1 | 16.2 | 30.3 | 48.5 | 65.7 | 74.7 | 87.0 | 93.9 | 96.0 | 96.0 | 97.0 | 97.0 | 96.0 | 98.0 | 98.0 | 98.0 | 99.0 | 98.0 | 94.0 | 8'64" | 18'58" |
| 6 | A mixture of Allethrin 2, Chryston 1 | 0.15 | 1.0 | 5.0 | 10.0 | 17.0 | 31.0 | 35.0 | 47.0 | 59.0 | 71.0 | 79.0 | 79.0 | 81.0 | 83.0 | 83.0 | 82.0 | 82.0 | 82.0 | 85.0 | 82.0 | 84.0 | 18'48" | |
| 7 | A mixture of Allethrin 5, d-trans-Chryston 1 | 0.15 | 3.1 | 9.2 | 13.3 | 21.4 | 32.7 | 38.8 | 54.1 | 64.1 | 77.6 | 82.7 | 83.7 | 82.7 | 85.7 | 85.7 | 86.7 | 86.7 | 88.8 | 89.0 | 87.8 | 88.8 | 15'30" | |

The present compositions in the form of fumigant can be extensively used as insecticides not only for domestic use for the control of sanitary injurious insects such as flies, mosquitoes and other injurious insects in the houses, but also for use in green houses, vinyl houses and ware houses, and for agricultural and horticultural purposes to control insects injurious to stored cereals and to agriculture and horticulture.

The present mixture can be formulated according to the conventional procedure into a markedly effective mosquito coil by incorporating 0.05 to 5 percent by weight of the present mixture as an active ingredient into a mosquito coil carrier, such as Tabu powder, marc, wood powder, starch and coconuts shell powder. Alternatively, the present mixture is incorporated in an amount of 0.05 to 90 percent by weight into a fiber or the like substrata, and then the resulting fumigant is placed on a hot plate heated by means of electric power or the like to a temperature of 120° to 400°C, whereby the active ingredient diffuses with lapse of time to display a fumigant effect for a long period of time. Still alternatively, the present mixture is formulated into an oil spray of 0.05 to 90 percent by weight concentration, and the oil spray is ascended by capillary action through a lamp-wick or the like and then heated, whereby a fumigant effect can be displayed as well.

The present mixture which is an active ingredient of the present compositions, may not only be used singly but may be incorporated with, as stabilizers, suitable amounts of phenol or bisphenol derivatives such as BHT or the like, or arylamines such as phenyl-α-naphthylamine, phenyl-β-naphthylamine or condensation product of phenetidine with acetone, whereby compositions which have been more stabilized in insecticidal effects can be obtained. Further, the compositions may be increased in insecticidal activity by incorporation of synergists for pyrethroid type insecticides such as α-[2-(2-butoxyethoxy)ethoxy]-4,5-methylenedioxy-2-propyltoluene (hereinafter referred to as "piperonyl butoxide"), N-(2-ethylhexyl)-bicyclo-(2,2,1)hepta-5-ene-anhydrophthalic acid-2,3-dicarboximide (hereinafter referred to as "MGK-264") and the like.

Procedures for the preparation of the present compositions and effects thereof are illustrated below with reference to examples and test examples, but it is needless to say that the scope of the present invention is not limited to the examples.

Example 1

0.05 Grams of Chrysron is sufficiently mixed with each 0.3 g, 0.25 g, 0.2 g and 0.15 g of allethrin, and the mixture is dissolved in 5 ml of methanol. This solution is mixed with a mosquito coil carrier (a 3 : 5 : 1 mixture of Tabu powder, pyrethrum marc and wood flour) to make the total amount 100 g, and the resulting mixture is uniformly stirred. After vaporizing the methanol, the mixture is sufficiently kneaded with 150 ml of water, and then shaped and dried to obtain a mosquito coil.

If necessary, the mosquito coil may be colored by addition of 0.5 percent of a dye such as Malachite Green or the like, or may be incorporated with a phenol or p-hydroxybenzoic acid ester.

Example 2

A mixture comprising 0.15 g of Chrysron and 0.1 g of BHT is sufficiently mixed with each 0 2 g, 0 15 g, 0.1 g and 0.05 g of allethrin, and the resulting mixture is dissolved in 5 ml of methanol. This solution is treated in the same manner as in Example 1 to obtain respective mosquito coils.

Example 3

0.025 Grams of d-trans-Chrysron is sufficiently mixed with each 0.325 g, 0.275 g, 0.225 g, 0.175 g and 0.125 g of allethrin, and the resulting mixture is dissolved in 5 ml of methanol. This solution is treated in the same manner as in Example 1 to obtain respective mosquito coils.

Example 4

A mixture comprising 0.1 g of d-trans-Chrysron and 0.6 g of MGK-264 is sufficiently mixed with each 0.25 g, 0.2 g, 0.15 g, 0.1 g and 0.05 g of allethrin, and the resulting mixture is dissolved in 5 ml of methanol. This solution is treated in the same manner as in Example 1 to obtain respective mosquito coils.

Example 5

Each of a mixture comprising 0.2 g of allethrin and 0.1 g of Chrysron and a mixture comprising 0.2 g of allethrin and 0.05 g of d-trans-Chrysron is dissolved in methanol. This solution is uniformly adsorbed on the surface of an asbestos piece of 2.5 cm × 1.5 cm in area and 0.3 cm in thickness. Onto the asbestos surface is pasted another asbestos piece identical in size therewith to obtain respective insecticidal fibrous fumigant compositions for use on an electrically heated plate. As the fibrous carrier, there may be used, in addition to asbestos, a pulp sheet or the like material which is identical in effectiveness therewith.

Insecticidal effects of the present compositions obtained in the above manner are shown below with reference to test examples.

Test Example 1

Into a (70 cm)$^3$ glass chamber were liberated about 50 adults of Northern house mosquitoes. 0.2 Grams of each of the mosquito coils obtained according to Examples 1, 2, 3 and 4 was ignited at both ends placed at the center of the bottom of the chamber. The smoke inside the chamber was stirred by means of a battery driven small motor fan (blade diameter 13 cm). As the result, every mosquito coil could knock down more than 90 percent of the mosquito adults within 20 minutes and could kill more than 80 percent of the insects on the next day.

Test Example 2

Into a (70 cm)$^3$ glass chamber were liberated about 50 adults of house flies. Each of the insecticidal fibrous fumigant compositions obtained according to Example 5 was put on an electric heating means, which was then placed at the center of the bottom of the chamber. Subsequently, an electric current was applied to the heating means, and the interior of the chamber was stirred by means of a battery driven motor fan (blade diameter 13 cm). As the result, every composition could kill more than 80 percent of the house fly adults within 20 minutes, and could kill more than 80 percent of the insects on the next day.

What is claimed is:

1. An insecticidal composition in the form of a fumigant comprising an inert carrier and as an essential ingredient an insecticidally effective amount of a mixture of (1) dl-2-allyl-3-methyl-cyclopent-2-ene-1-one-4-yl dl-cis, trans-chrysanthemate and (2) 5-benzyl-3-furylmethyl dl-cis, trans-chrysanthemate or 5-benzyl-3-furylmethyl-d-trans-chrysanthemate, the mixing weight ratio of (1) to (2) being 10 : 0.5 to 30.

2. The insecticidal composition of claim 1, wherein the effective amount is of 0.05 to 90 percent by weight based on the weight of the composition.

3. The insecticidal composition of claim 1, wherein the composition is a mosquito coil.

4. A method for killing insects, which comprises exposing insects to the vapor produced from the insecticidal composition of claim 1.

* * * * *